(12) United States Patent
Kirzhner et al.

(10) Patent No.: US 11,890,998 B2
(45) Date of Patent: Feb. 6, 2024

(54) SEAT TRIM PANEL

(71) Applicant: Lear Corporation, Southfield, MI (US)

(72) Inventors: Rochelle Kirzhner, Southfield, MI (US); Laura Schulz, Bloomfield Hills, MI (US); Ron Miotto, Redford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/490,528

(22) Filed: Sep. 30, 2021

(65) Prior Publication Data
US 2023/0097929 A1 Mar. 30, 2023

(51) Int. Cl.
*A47C 7/02* (2006.01)
*B60N 2/58* (2006.01)
*B60N 2/68* (2006.01)
*B60R 13/02* (2006.01)

(52) U.S. Cl.
CPC .............. *B60R 13/02* (2013.01); *B60N 2/686* (2013.01)

(58) Field of Classification Search
CPC .. B60N 2/5825; B60N 2/6009; B60N 2/7094; B60N 2/72
See application file for complete search history.

(56) References Cited

U.S. PATENT DOCUMENTS

| | | | | |
|---|---|---|---|---|
| 3,841,700 A * | 10/1974 | Beck | ......................... | B60N 2/60 297/219.1 |
| 6,213,557 B1 * | 4/2001 | Aebischer | .............. | B60N 2/686 297/DIG. 2 |
| 8,733,834 B2 * | 5/2014 | Palmer | ................... | B60N 2/585 297/218.4 |
| 9,073,469 B2 * | 7/2015 | Fujikawa | ................. | B60N 2/72 |
| 9,167,910 B2 * | 10/2015 | Krupiczewicz | ........ | A47C 31/11 |
| 9,278,636 B2 | 3/2016 | Duncan et al. | | |
| 9,649,963 B2 * | 5/2017 | Line | ...................... | B60N 2/7005 |
| 9,669,744 B2 * | 6/2017 | Cao | ...................... | B60N 2/5816 |
| 9,845,032 B1 * | 12/2017 | Line | ........................ | B60N 2/682 |
| 10,011,204 B2 * | 7/2018 | Line | .......................... | B60N 2/58 |
| 10,399,472 B2 * | 9/2019 | Iwakata | ................. | B60N 2/688 |
| 10,640,024 B2 * | 5/2020 | Inoue | ..................... | B60N 2/682 |
| 10,843,602 B2 * | 11/2020 | Verde | ................... | B60N 2/5816 |
| 10,864,833 B2 | 12/2020 | Rus et al. | | |
| 11,433,791 B2 * | 9/2022 | Marquès | .............. | B60N 2/5833 |
| 2004/0049309 A1 * | 3/2004 | Gardner | ................... | A41H 1/00 700/132 |
| 2011/0198896 A1 * | 8/2011 | Brinster | ................. | A47C 7/622 297/188.06 |
| 2012/0161481 A1 * | 6/2012 | Tache | ..................... | B60N 2/879 174/99 R |
| 2012/0274116 A1 * | 11/2012 | Palmer | ................. | B60N 2/5841 297/396 |
| 2016/0288678 A1 * | 10/2016 | Berry | .................... | B60N 2/5642 |
| 2018/0037148 A1 * | 2/2018 | Line | .......................... | B60N 2/72 |
| 2019/0232836 A1 * | 8/2019 | Rylance | ................ | B60N 2/64 |
| 2020/0046137 A1 * | 2/2020 | Ohtsu | .................. | B60N 2/5883 |
| 2021/0086670 A1 * | 3/2021 | Kozlowski | .......... | B60N 2/5685 |

(Continued)

FOREIGN PATENT DOCUMENTS

EP 3486113 A1 5/2019

*Primary Examiner* — Shin H Kim
(74) *Attorney, Agent, or Firm* — Brooks Kushman P.C.

(57) ABSTRACT

A trim panel is sized to be attached to a lower region of a seat back and extend over a portion of a seat bottom. The trim panel is formed from a flexible material without carpet.

20 Claims, 4 Drawing Sheets

(56) References Cited

U.S. PATENT DOCUMENTS

| | | | |
|---|---|---|---|
| 2021/0146813 A1* | 5/2021 | Marquès | B60N 2/646 |
| 2021/0221266 A1* | 7/2021 | Kozlowski | B32B 37/182 |
| 2021/0316644 A1* | 10/2021 | Marquès | B60N 2/5833 |
| 2022/0227272 A1* | 7/2022 | Schulz | B60N 2/5833 |

* cited by examiner

SEAT TRIM PANEL

TECHNICAL FIELD

Various embodiments relate to seat trim panels and assemblies.

BACKGROUND

Duncan et al. U.S. Pat. No. 9,278,636 B2 discloses a seat trim panel and issued Lear Corporation on Mar. 8, 2016.

SUMMARY

According to an embodiment, a trim panel is sized to be attached to a lower region of a vehicle seat back and extend over a portion of a seat bottom. The trim panel is formed from a flexible material without carpet.

According to a further embodiment, the trim panel is formed from a vinyl material.

According to another further embodiment, the trim panel is contoured to conform to the seat back and the seat bottom.

According to an even further embodiment, the trim panel is molded to contour to the seat back and the seat bottom.

According to another further embodiment, the trim panel is not molded to contour to the seat back and the seat bottom.

According to another further embodiment, the trim panel is formed from a flat layer that is sewn to contour to the seat back and the seat bottom.

According to another further embodiment, the trim panel is formed from a flat layer with slits between regions that are sewn together to contour to the seat back and the seat bottom.

According to another embodiment, a trim assembly is provided with a trim panel substrate sized to be attached to a lower region of a seat back and extend over a portion of a seat bottom. A trim panel is provided over the trim panel substrate. The trim panel is sized to be attached to the lower region of the seat back and extend over a portion of the seat bottom. The trim panel is formed from a flexible material without carpet.

According to a further embodiment, the trim assembly is not molded to contour to the seat back and the seat bottom.

According to another further embodiment, the trim panel substrate is formed from a flat layer. The trim panel is formed from a flat layer. The trim panel substrate and the trim panel are sewn together to contour to the seat back and the seat bottom.

According to an even further embodiment, the trim panel substrate and the trim panel are formed with slits between regions that sewn together to contour to the seat back and the seat bottom.

According to another further embodiment, the trim panel is oversized relative to the trim panel substrate to cover outboard edges of the trim panel substrate.

According to another embodiment, a seat assembly is provided with a seat bottom, and a seat back connected for movement relative to the seat bottom. A trim panel is sized to be attached to a lower region of the seat back and extend over a portion of a seat bottom to cover a portion of the seat bottom in various positions of the seat back. The trim panel is formed from a flexible material without carpet.

According to a further embodiment, a central recess is formed in a rear region of the seat bottom. The trim panel is contoured to extend into the central recess.

According to another further embodiment, a central recess is formed in a lower, rear region of the seat back. The trim panel is contoured to extend into the central recess.

According to another further embodiment, a first central recess is formed in a rear region of the seat bottom. A second central recess is formed in a lower, rear region of the seat back, aligned with the first central recess. The trim panel is contoured to extend into the first central recess and the second central recess.

According to another embodiment, a trim assembly is provided with a trim panel substrate sized to be attached to a lower region of a seat back and extend over a portion of a seat bottom. A polymeric layer is provided over the trim panel substrate.

According to a further embodiment, the trim assembly is formed without carpet.

According to another further embodiment, the polymeric layer is formed from vinyl.

According to another embodiment, a seat assembly is provided with a seat bottom. A first central recess is formed in a rear region of the seat bottom. A seat back is connected for movement relative to the seat bottom. A second central recess is formed in a lower, rear region of the seat back, aligned with the first central recess. A trim panel is attached to a lower region of the seat back to extend over a portion of the seat bottom. The trim panel is contoured to extend into the first central recess and the second central recess.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
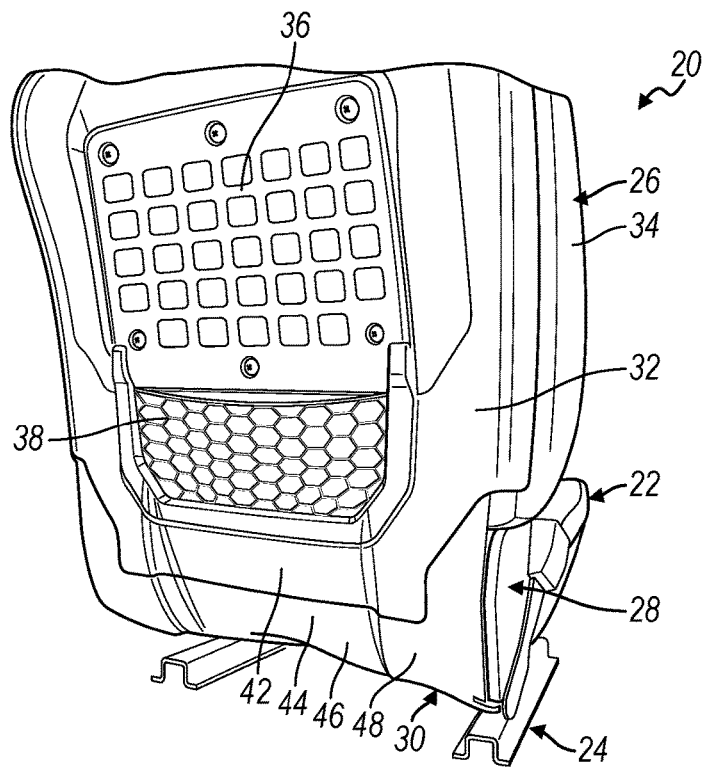
FIG. 1 is a partial rear perspective view of a seat assembly with a trim panel, according to an embodiment.

FIG. 1 illustrates a rear perspective view of a seat assembly 20 according to an embodiment. The seat assembly 20 is depicted as a vehicle seat assembly 20. The seat assembly 20 may be a seat assembly 20 of a land vehicle, a watercraft, an aircraft, or the like. The seat assembly 20 may be a front row seat assembly 20, or a second or subsequent row seat assembly 20. Although a vehicle seat assembly 20 is illustrated, any seat assembly 20 is contemplated, such as office furniture.

The seat assembly 20 includes a seat bottom 22 for supporting an occupant thereupon. In the depicted embodiment, seat tracks 24 are provided. The seat tracks 24 are mounted beneath the seat bottom 22 to attach the seat bottom 22 to a vehicle floor. The seat tracks 24 may also offer adjustment of the seat bottom 22 relative to the vehicle floor.

Figure 2:
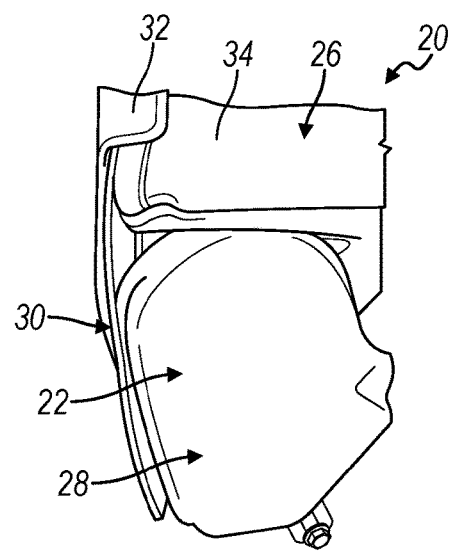
FIG. 2 is an enlarged partial side perspective view of the seat assembly of FIG. 1.

The seat assembly 20 also includes a seat back 26 extending up from the seat bottom 22 to support a back of an occupant rested against the seat back 26. In the depicted embodiment, the seat back 26 is connected to and supported by the seat bottom 22. Referring now to FIGS. 1 and 2, a recline mechanism 28 is supported upon lateral sides of the seat bottom 22. The seat back 26 is connected to the recline mechanism 28 and supported by the recline mechanism 28 and the seat bottom 22. The recline mechanism 28 permits pivotal adjustment of the seat back 26 relative to the seat bottom 22 for occupant recline adjustment, and for folding the seat back 26 for ingress, egress or cargo storage.

Figure 3:
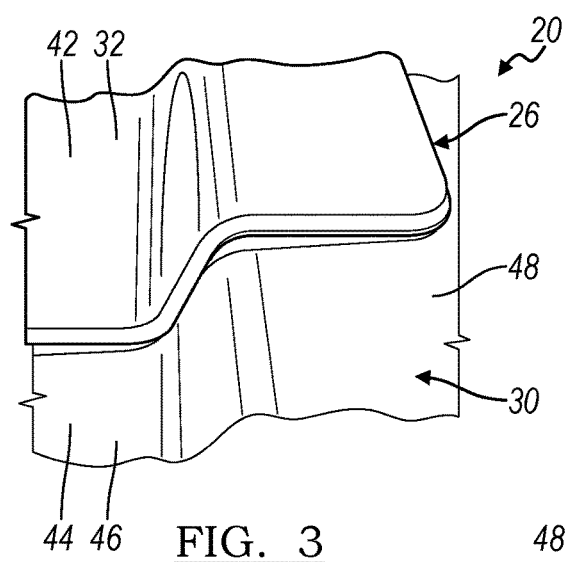
FIG. 3 is an enlarged partial rear perspective view of the seat assembly of FIG. 1.

Referring now to FIGS. 1-3, the seat assembly 20 includes a trim panel 30 that is attached to a lower region of the seat back 26. The trim panel 30 extends below the seat back 26 to cover a portion of the seat bottom 22. The trim panel 30 conceals a gap between a top of the seat bottom 22 and a bottom of the seat back 26. The trim panel 30 is referred to as a toe-kick panel 30. The trim panel 30 is flexible to cover the gap at various pivotal positions of the seat back 26 relative to the seat bottom 22. The prior art has provided carpeted toe-kicks to conceal the gap. However, carpeted toe-kicks readily get dirty from contact with soiled footwear and cargo. The carpeted toe-kicks are also difficult to clean and maintain clean.

The trim panel 30 is illustrated attached to the seat back 26 in FIGS. 1-3. The trim panel 30 is also illustrated disassembled from the seat assembly 20 in FIGS. 4 and 5. The trim panel 30 is formed from a polymeric material, without carpet for ease in cleaning and for maintaining the trim panel 30 clean. According to an embodiment, the trim panel 30 is formed from a vinyl material. The vinyl material may match other components within the vehicle interior, such as other seat trim panels, door panels, flooring, or the like.

The trim panel 30 is contoured to conform to a contour of the seat back 26 and the seat bottom 22. The contoured shape of the trim panel provides ornamental continuity from the seat back 26 to the seat bottom 22. The trim panel 30 is molded to obtain the contoured shape.

Referring to FIGS. 1-3, the seat back 26 includes a rigid rear panel 32. The rear panel 32 is a relatively rigid polymeric panel 32 that is attached to a rear surface of the seat back 26. The rear panel 32 covers and encloses a rear region of the seat back and cooperates with a fabric cover 34 over occupant contact surfaces of the seat back 26. Referring to FIG. 1, the rear panel 32 may also support accessories, such as a modular equipment board 36 and a netted pocket 38.

Figure 4:
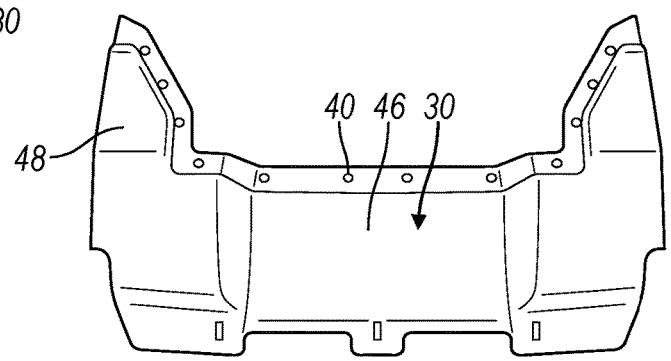
FIG. 4 is a rear perspective view of the trim panel of FIG. 1.
Figure 5:
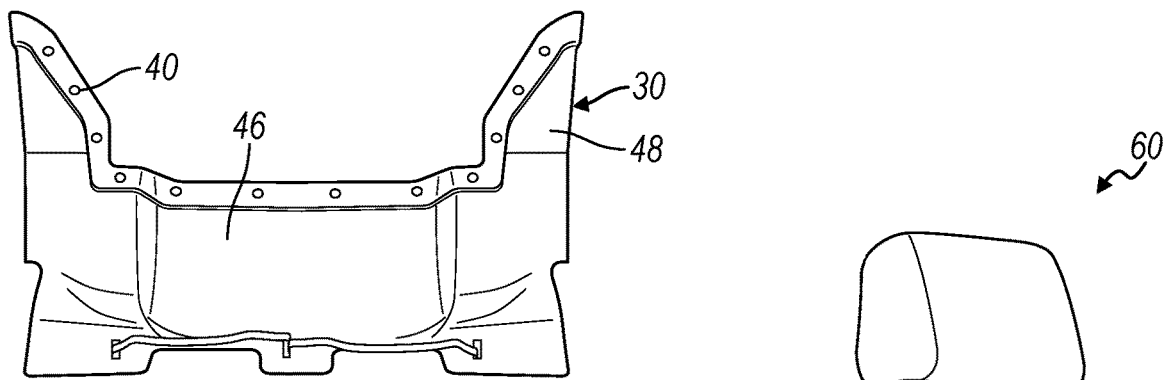
FIG. 5 is a front perspective view of the trim panel of FIG. 1.

As illustrated in FIGS. 1-3, the trim panel 30 is attached to a lower end of the rear panel 32. Referring now to FIGS. 1-5, an upper region of the trim panel 30 has an edge shaped to follow a lower edge of the rear panel. In FIGS. 4 and 5, a series of apertures 40 are formed though the trim panel 30 adjacent to the upper edge. The apertures 40 are sized to receive fasteners that connect the rear panel 32 to a frame of the seat back 26.

Referring again to FIGS. 1 and 3, a central recess 42 is formed in a lower, rear region of the seat back 26. Likewise, a central recess 44 is formed in a rear region of the seat bottom 22, between the recline mechanisms 28, and aligned with the seat back recess 42. The recesses 42, 44 collectively provide additional clearance for cargo or an occupant seated behind the seat assembly 20. As illustrated in FIGS. 1, 2, 4 and 5, the trim panel 30 is contoured with a central region 46 that is offset forward from a pair of outboard regions 48 so that the central region 46 extends into the recesses 42, 44.

Figure 6:
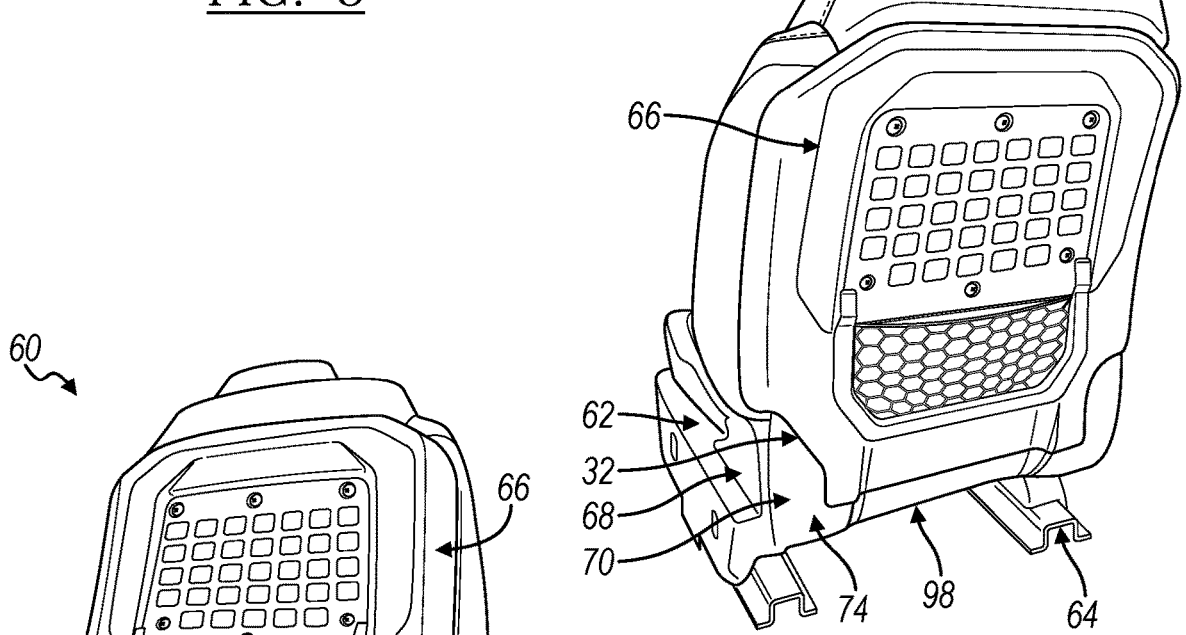
FIG. 6 is a rear perspective view of a seat assembly with a trim assembly, according to another embodiment.
Figure 7:
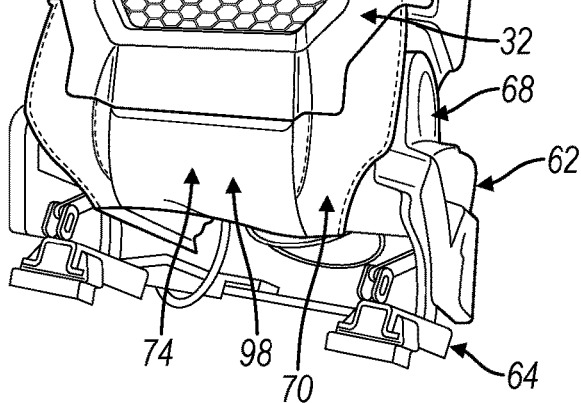
FIG. 7 is a rear perspective view of the seat assembly of FIG. 6.
Figure 8:
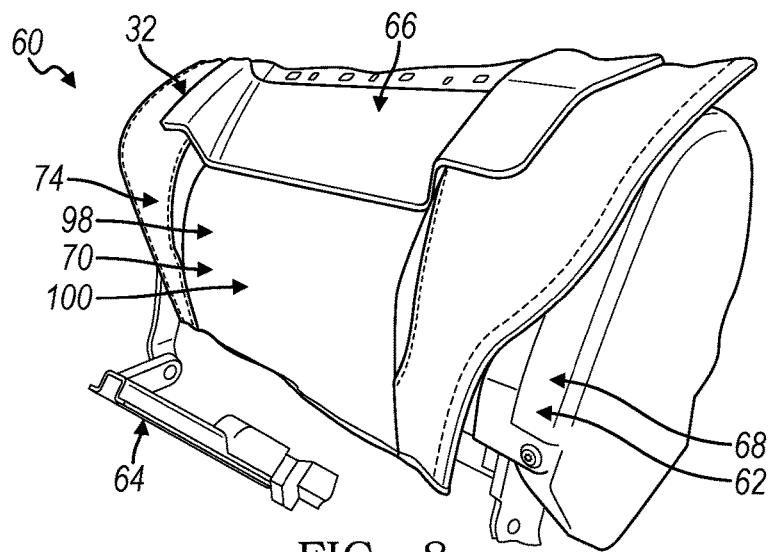
FIG. 8 is an enlarged partial rear perspective view of the seat assembly of FIG. 6, illustrated in a folded position of a seat back.

FIG. 6-8 illustrates rear perspective views of a seat assembly 60 according to another embodiment. The seat assembly 60 includes a seat bottom 62 supported upon seat tracks 64. A seat back 66 extends upright from a recline mechanism 68 of the seat bottom 62. The seat assembly 60 includes a trim assembly 70 that is attached to a lower region of the seat back 66. The trim assembly 70 extends below the seat back 66 to cover a portion of the seat bottom 62. The trim assembly 70 conceals a gap between a top of the seat bottom 62 and a bottom of the seat back 66. The trim assembly 70 is also referred to as a toe-kick assembly 70. The trim assembly 70 is flexible to cover the gap at various pivotal positions of the seat back 66 relative to the seat bottom 62.

The trim assembly 70 is illustrated attached to the seat back 66 in FIGS. 6-8. FIGS. 6 and 7 illustrate the seat assembly 60 with the seat back 66 in an upright orientation. FIG. 8 illustrates the seat assembly 60 with the seat back 66 pivoted forward to a folded position. The trim assembly 70 is also illustrated disassembled from the seat assembly 60 in FIGS. 9 and 10. The trim assembly 70 is formed from polymeric materials, without carpet for ease in cleaning and for maintaining the trim assembly 70 clean.

Figure 11:
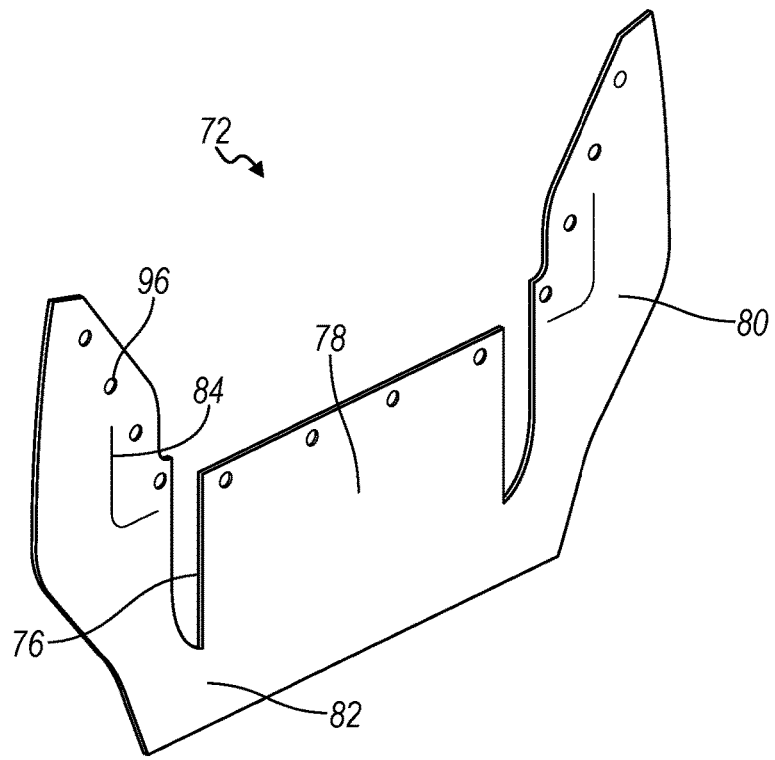
FIG. 11 is a perspective view of a substrate of the trim assembly of FIG. 6.
Figure 12:
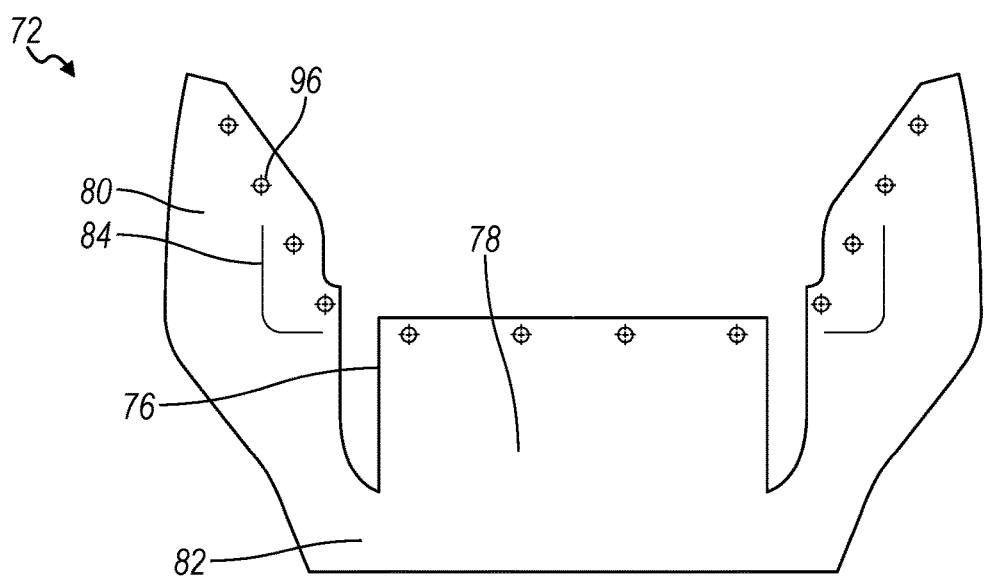
FIG. 12 is an elevation view of the substrate of FIG. 11.

According to an embodiment, the trim assembly 70 is formed with a substrate 72 for support, with a trim panel cover 74 attached to the substrate 72. The substrate 72 is illustrated behind the panel 74 in FIG. 10. The substrate 72 is also illustrated separated from the trim panel 74 in FIGS. 11 and 12. Referring to FIGS. 11 and 12, the substrate 72 is formed from a flat semi-rigid polymeric material. The substrate 72 is formed with slots 76 that extend partially through the substrate in an upright direction to separate the substrate to a central region 78, and a pair of lateral outboard regions 80. The lateral outboard regions 80 are attached to the central region 78 at webs 82 beneath the slots 76. The slots 76 permit deformation and contouring of the substrate 72 without molding the substrate 72. Additional slits 84 are formed in the lateral regions 80 of the substrate 72 to permit additional deformation and contouring of the lateral regions 80.

Figure 9:
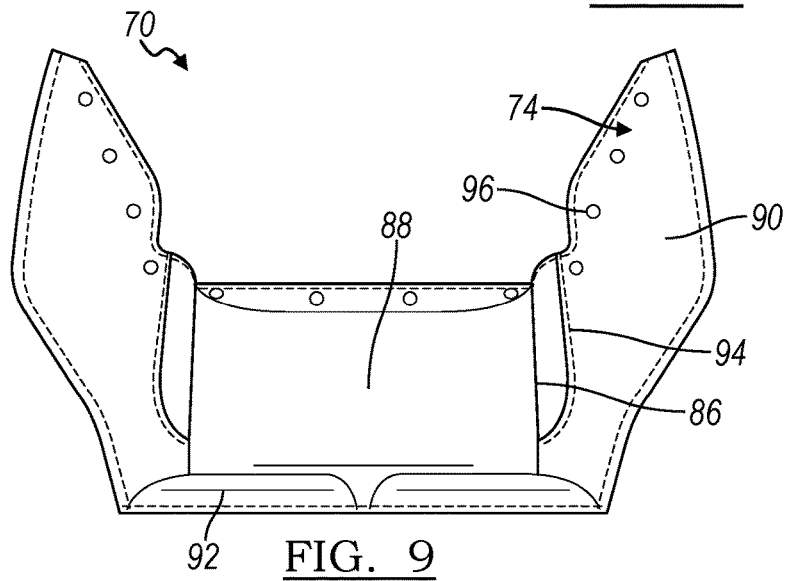
FIG. 9 is a rear perspective view of the trim assembly of the seat assembly of FIG. 6.
Figure 10:
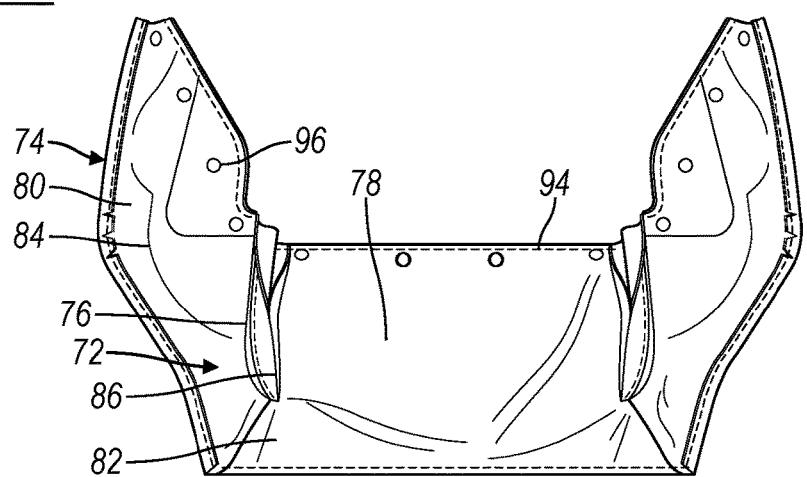
FIG. 10 is a front perspective view of the trim assembly of FIG. 6.

Referring now to FIGS. 9 and 10, the trim panel 74 is oversized relative to the substrate 72 to cover outboard edges of the substrate 72 to avoid any exposed or raw edges. The trim panel 74 may be formed from vinyl or any suitable material. Slits 86 are formed in the trim panel 74 to provide a central region 88 and a pair of lateral regions 90 connected by webs 92 beneath the slits 86. The slits 86 are narrower than the corresponding slots 76 in the substrate 72.

The trim panel 74 is sewn with stitching 94 to the substrate 72 along peripheral edges and along the slots 76. The stitching 94 applies tension within the panel 74 to compress the substrate 72 to converge the lateral portions 80, 90 of the substrate 72 and the panel 74 at the slots 76 and slits 86 of the substrate 72 and the panel 74. This deformation contours the trim assembly 70 without molding the trim assembly 70. Therefore, the substrate 72 and the panel 74 may each be formed from a flat layer that are sewn together and not molded to provide the contour to match the seat back 66 and the seat bottom 62. By eliminating molding of the trim assembly 70, some manufacturing costs associated with equipment, tooling, time, and energy, can be eliminated.

As illustrated in FIGS. 6-8, the trim assembly 70 is attached to a lower end of the rear panel 32 of the seat assembly 60. Referring to FIGS. 9 and 10, an upper region of the trim assembly 70 has an edge shaped to follow a lower edge of the rear panel 32. In 9-12, a series of apertures 96 are formed though the trim assembly 70 adjacent to the upper edge. The apertures 96 are sized to receive fasteners that connect the rear panel 32 to a frame of the seat back 66.

Referring again to FIGS. 6-8, a central recess 98 is formed in a lower, rear region of the seat back 66. Likewise, a central recess 100 is formed in a rear region of the seat bottom 62, between the recline mechanisms 68, and aligned with the seat back recess 98. The recesses 98, 100 collectively provide additional clearance for cargo or an occupant seated behind the seat assembly 60. As illustrated in FIGS. 6-10, the trim assembly 70 is contoured with the central regions 78, 88 extending into the recesses 98, 100.

The substrate 72 provides flexibility to the trim assembly 70 to engage the recesses 98, 100. The substrate 72 also acts as a stiffener and provides rigidity to the trim panel 74 to avoid wrinkles or creases in the trim panel 74.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat bottom comprising a first central recess formed in a rear region of the seat bottom;
    a seat back connected for movement relative to the seat bottom, wherein a second central recess is formed in a lower, rear region of the seat back, and wherein the second central recess of the seat back is aligned with the first central recess of the seat bottom;
    a rear panel attached to a rear surface of the seat back, wherein the rear panel is contoured to extend into the first central recess;
    a trim panel attached to a lower end of the rear panel at a lower region of the seat back and extending over a portion of the seat bottom, to cover the portion of the seat bottom in various positions of the seat back relative to the seat bottom, wherein the trim panel is contoured with a pair of lateral outboard regions to extend into the first central recess of the seat bottom and the second central recess of the seat back, and wherein a series of apertures are formed through the trim panel and the series of apertures are configured to receive fasteners to connect the trim panel to the rear panel.

2. The seat assembly of claim 1 wherein the trim panel is formed from a vinyl material.

3. The seat assembly of claim 1 wherein the trim panel is contoured to conform to the seat back and the seat bottom.

4. The seat assembly of claim 3 wherein the trim panel is molded to contour to the seat back and the seat bottom.

5. The seat assembly of claim 3 wherein the trim panel is not molded to contour to the seat back and the seat bottom.

6. The seat assembly of claim 3 wherein the trim panel is formed from a flat layer that is sewn to contour to the seat back and the seat bottom.

7. The seat assembly of claim 3 wherein the trim panel is formed from a flat layer with slits between regions that are sewn together to contour to the seat back and the seat bottom.

8. The seat assembly of claim 1 further comprising:
    a trim panel substrate sized to be attached to the lower region of the seat back and extend over the portion of the seat bottom; and
    wherein the trim panel is provided over the trim panel substrate.

9. The seat assembly of claim 8 wherein the trim panel substrate is not molded to contour to the seat back and the seat bottom.

10. The seat assembly of claim 8 wherein the trim panel substrate is formed from a flat layer;
    wherein the trim panel is formed from a flat layer; and
    wherein the trim panel substrate and the trim panel are sewn together to contour to the seat back and the seat bottom.

11. The seat assembly of claim 10 wherein the trim panel substrate and the trim panel are formed with slits between regions that are sewn together to contour to the seat back and the seat bottom.

12. The seat assembly of claim 8 wherein the trim panel is oversized relative to the trim panel substrate to cover outboard edges of the trim panel substrate.

13. The seat assembly of claim 8 wherein the trim panel further comprises a polymeric layer provided over the trim panel substrate.

14. The seat assembly of claim 1 wherein the trim panel is formed without carpet.

15. The seat assembly of claim 13 wherein the polymeric layer is formed from vinyl.

16. A seat assembly comprising:
    a seat bottom, wherein a first central recess is formed in a rear region of the seat bottom;
    a seat back connected for movement relative to the seat bottom, wherein a second central recess is formed in a lower, rear region of the seat back, aligned with the first central recess;
    a trim panel attached to a lower region of the seat back to extend over a portion of the seat bottom, wherein the trim panel is contoured with a pair of lateral outboard regions and a central region to extend into the first central recess and the second central recess;
    wherein the trim panel is formed from a flat layer with slots between the central region and each of the pair of lateral outboard regions and the lateral outboard regions are attached to the central region at webs beneath the slots; and
    a trim panel cover that is oversized relative to the trim panel, wherein the trim panel cover and the trim panel are sewn together to contour to the first central recess and the second central recess of the seat back and the seat bottom.

17. The seat assembly of claim 1 wherein the seat back further comprises a fabric cover over occupant contact surfaces; and
    wherein the rear panel cooperates with the fabric cover.

18. The seat assembly of claim 17 wherein the rear panel is contoured to extend into the first central recess.

19. The seat assembly of claim 1 wherein the trim panel is contoured with a pair of lateral outboard regions and a central region to extend into the first central recess and the second central recess;
    wherein the trim panel is formed from a flat layer with slots between the central region and each of the pair of lateral outboard regions and the lateral outboard regions are attached to the central region at webs beneath the slots; and
    wherein the seat assembly further comprises a trim panel cover that is oversized relative to the trim panel, wherein the trim panel cover and the trim panel are sewn together to contour to the first central recess and the second central recess of the seat back and the seat bottom.

20. The seat assembly of claim 1 wherein the trim panel is contoured with a central region that is offset forward from the pair of outboard regions such that the central region extends into the first central recess and the second central recess.

\* \* \* \* \*